(12) United States Patent
Nakamori

(10) Patent No.: US 11,196,292 B2
(45) Date of Patent: Dec. 7, 2021

(54) UNINTERRUPTIBLE POWER SUPPLY SYSTEM

(71) Applicant: TOSHIBA MITSUBISHI-ELECTRIC INDUSTRIAL SYSTEMS CORPORATION, Chuo-ku (JP)

(72) Inventor: Toshiki Nakamori, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 17/057,839

(22) PCT Filed: May 31, 2018

(86) PCT No.: PCT/JP2018/020949
§ 371 (c)(1),
(2) Date: Nov. 23, 2020

(87) PCT Pub. No.: WO2019/229930
PCT Pub. Date: Dec. 5, 2019

(65) Prior Publication Data
US 2021/0210977 A1 Jul. 8, 2021

(51) Int. Cl.
H02J 9/06 (2006.01)
H02M 1/08 (2006.01)
(Continued)

(52) U.S. Cl.
CPC ............... *H02J 9/062* (2013.01); *H02M 1/08* (2013.01); *H02M 1/14* (2013.01); *H02M 7/21* (2013.01);
(Continued)

(58) Field of Classification Search
USPC .......................................................... 307/43
See application file for complete search history.

(56) References Cited

FOREIGN PATENT DOCUMENTS

JP     11-178243 A    7/1999
JP    2005-110397 A    4/2005
(Continued)

OTHER PUBLICATIONS

International Search Report dated Aug. 14, 2018 in PCT/JP2018/020949 filed on May 31, 2018.
(Continued)

*Primary Examiner* — Toan T Vu
*Assistant Examiner* — Xuan Ly
(74) *Attorney, Agent, or Firm* — Oblon, McClelland, Maier & Neustadt, L.L.P.

(57) ABSTRACT

A plurality of gate drive circuits each drive a gate of a corresponding one of a plurality of switching elements included in a converter and an inverter. Each gate drive circuit includes a gate driver and a power source circuit. The gate driver drives the gate potential of the switching element to a potential corresponding to H or L level, in accordance with the gate signal input from a controller to the gate electrode of the switching element. The power source circuit supplies power to the gate driver. When a first switch is ON and a second switch is OFF, the controller, upon detection of an abnormality of the power source circuit of the gate drive circuit, turns on the second switch and turns off the first switch. The gate drive circuit maintains the gate potential of the switching element during the period from when the abnormality of the power source circuit is detected to when the second switch is turned on.

7 Claims, 10 Drawing Sheets

(51) Int. Cl.
*H02M 1/14* (2006.01)
*H02M 7/21* (2006.01)
*H02M 7/537* (2006.01)
*H02M 1/42* (2007.01)

(52) U.S. Cl.
CPC .......... *H02M 7/537* (2013.01); *H02M 1/4283* (2021.05)

(56) References Cited

FOREIGN PATENT DOCUMENTS

| | | | |
|---|---|---|---|
| JP | 2014124017 | * | 7/2014 |
| JP | 2016-49011 A | | 4/2016 |

OTHER PUBLICATIONS

Office Action dated Mar. 3, 2021 in corresponding Indian Patent Application No. 202017052990 (with English Translation), 6 pages.

* cited by examiner

UNINTERRUPTIBLE POWER SUPPLY SYSTEM

TECHNICAL FIELD

The present invention relates to an uninterruptible power supply system.

BACKGROUND ART

For example, Japanese Patent Laying-Open No. 11-178243 (PTL 1) discloses an uninterruptible power supply system including a converter that converts AC power from a commercial power source into DC power, and an inverter that converts DC power into AC power to supply the AC power to a load. The uninterruptible power supply system described in PTL 1 includes an output switch between the inverter and the load, and a thyristor switch between the commercial power source and the load. The uninterruptible power supply system is configured to switch between the commercial power source and the inverter for power supply to the load, based on an ON instruction to the output switch or thyristor switch.

In the system of PTL 1, when an abnormality is detected in the control power source for a control means that generates the ON instruction during the inverter power supply mode, a circuit for detecting abnormality in the control power source sends an abnormality detection signal while the control power source is backed up by a capacitor. With this configuration, an abnormality of the control power source causes switching from the inverter to the commercial power source, thereby allowing uninterrupted power supply to the load.

CITATION LIST

Patent Literature

PTL 1: Japanese Patent Laying-Open No. 11-178243

SUMMARY OF INVENTION

Technical Problem

Such an uninterruptible power supply system typically includes gate drive circuits for driving the gates of a plurality of switching elements included in the converter and inverter. Each gate drive circuit is configured to drive the gate potential of a corresponding switching element to a logical high (H) level or logical low (L) level in accordance with a gate signal from a controller.

When an abnormality occurs in a power source for such a gate drive circuit, the power source cannot properly supply a source voltage to the gate drive circuit. This may cause an unsteady gate potential of the switching element until the power supply to the load is switched from the inverter to the commercial power source. During this time, the switching element may malfunction, such as being erroneously turned on or erroneously turned off.

The present invention has been made to solve such a problem. An object of the present invention is to provide an uninterruptible power supply system that can switch from an inverter to a bypass AC power source for power supply to a load, upon occurrence of an abnormality of the power source for a gate drive circuit, without causing malfunctions of a switching element.

Solution to Problem

An uninterruptible power supply system according to the present invention includes a first terminal connected to a commercial AC power source, a second terminal connected to a bypass AC power source, a third terminal connected to a load, a converter, an inverter, a first switch, a second switch, a controller, and a plurality of gate drive circuits. The converter includes a plurality of switching elements, and converts AC power supplied from the commercial AC power source through the first terminal into DC power. The inverter includes a plurality of switching elements, and converts DC power generated by the converter or DC power from a power storage device into AC power. The first switch has one terminal that receives an output voltage of the inverter, and the other terminal connected to the third terminal. The second switch is connected between the second terminal and the third terminal. The controller controls on and off of the plurality of switching elements included in the converter and the inverter. The plurality of gate drive circuits each drive a gate of a corresponding switching element of the plurality of switching elements. Each of the plurality of gate drive circuits includes a gate driver and a power source circuit. The gate driver drives a gate potential of the switching element to a potential corresponding to an H level or an L level, in accordance with a gate signal input from the controller to a gate electrode of the switching element. The power source circuit supplies power to the gate driver. The controller includes an abnormality detection circuit that detects an abnormality of the power source circuit of each of the plurality of gate drive circuits. When the first switch is ON and the second switch is OFF, the controller, upon detection of the abnormality of the power source circuit by the abnormality detection circuit, turns on the second switch and turns off the first switch. The gate drive circuit maintains the gate potential of the switching element during a period from when the abnormality of the power source circuit is detected to when the second switch is turned on.

Advantageous Effects of Invention

The present invention provides an uninterruptible power supply system that can switch from an inverter to a bypass AC power source for power supply to a load, upon occurrence of an abnormality of the power source for a gate drive circuit, without causing malfunctions of a switching element.

DESCRIPTION OF EMBODIMENTS

Figure 1:
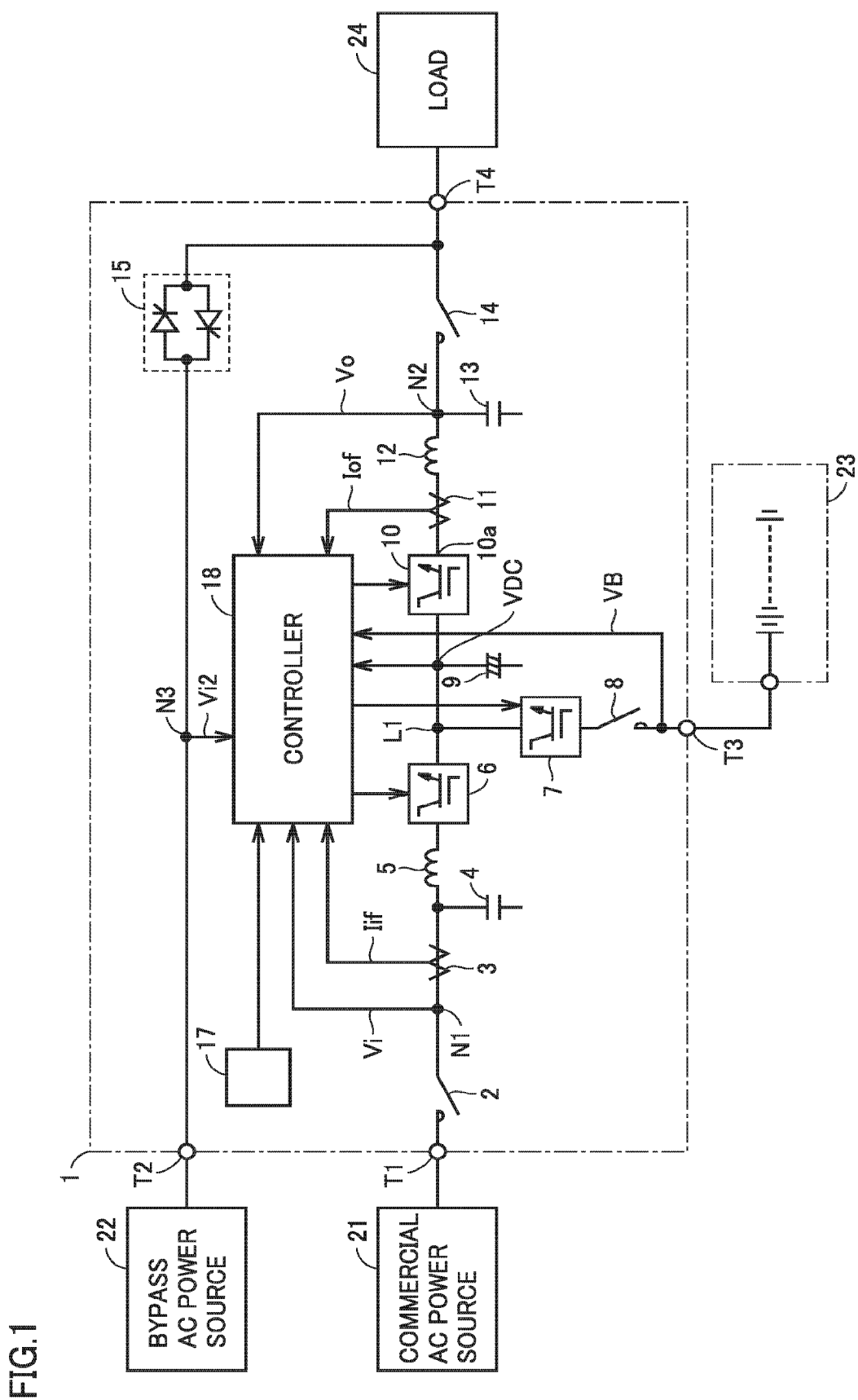
FIG. 1 is a circuit block diagram showing a configuration of an uninterruptible power supply system according to an embodiment of the present invention.

An embodiment of the present invention will now be described in detail with reference to the drawings. Identical or corresponding parts in the drawings are denoted by identical reference signs, and the description of such parts is not basically repeated.

FIG. 1 is a circuit block diagram showing a configuration of an uninterruptible power supply system according to an embodiment of the present invention. An uninterruptible power supply system 1 converts three-phase AC power from a commercial AC power source 21 into DC power, and converts the DC power into three-phase AC power to supply the AC power to a load 24. For simplicity of the illustration and description, FIG. 1 shows a circuit for only a single phase (e.g., U phase) of the three phases (U, V, and W phases).

Uninterruptible power supply system 1 has an inverter power supply mode (first mode) and a bypass power supply mode (second mode). The inverter power supply mode is an operation mode in which AC power is supplied from an inverter 10 to load 24. The bypass power supply mode is an operation mode in which AC power is supplied from a bypass AC power source 22 to load 24 through a semiconductor switch 15 (second switch).

In the inverter power supply mode, AC power supplied from commercial AC power source 21 is converted into DC power by a converter 6, and the DC power is converted into AC power by inverter 10 to be supplied to load 24. The inverter power supply mode allows stable power supply to load 24.

In the bypass power supply mode, AC power supplied from bypass AC power source 22 is supplied to load 24 through semiconductor switch 15 (second switch), i.e., not through converter 6 and inverter 10. The bypass power supply mode does not involve power losses at converter 6 and inverter 10, allowing increased operating efficiency of uninterruptible power supply system 1.

In FIG. 1, uninterruptible power supply system 1 includes an AC input terminal T1, a bypass input terminal T2, a battery terminal T3, and an AC output terminal T4. AC input terminal T1 receives AC power having a commercial frequency from commercial AC power source 21. Bypass input terminal T2 receives AC power having a commercial frequency from bypass AC power source 22. Bypass AC power source 22 may be a commercial AC power source or a generator.

Battery terminal T3 is connected to a battery (power storage device) 23. Battery 23 stores DC power. Instead of battery 23, a capacitor may be connected. AC output terminal T4 is connected to load 24. Load 24 is driven by AC power.

Uninterruptible power supply system 1 further includes electromagnetic contactors 2, 8, 14, current detectors 3, 11, capacitors 4, 9, 13, reactors 5, 12, converter 6, a bidirectional chopper 7, inverter 10, semiconductor switch 15, an operation unit 17, and a controller 18.

Electromagnetic contactor 2 and reactor 5 are connected in series between AC input terminal T1 and the input node of converter 6. Capacitor 4 is connected to a node N1 between electromagnetic contactor 2 and reactor 5. Electromagnetic contactor 2 is turned on at the time of use of uninterruptible power supply system 1, and is turned off at the time of, for example, maintenance of uninterruptible power supply system 1.

The instantaneous value of AC input voltage Vi appearing at node N1 is detected by controller 18. Based on the instantaneous value of AC input voltage Vi, controller 18 determines, for example, whether a power outage has occurred. Current detector 3 detects an AC input current Ii flowing through node N1, and provides a signal Iif indicating the detection value to controller 18.

Capacitor 4 and reactor 5 form a low-pass filter. The low-pass filter allows AC power having a commercial frequency from commercial AC power source 21 to pass to converter 6, and blocks a signal having a switching frequency generated at converter 6 from passing to commercial AC power source 21.

Converter 6 is controlled by controller 18. At normal times, in which AC power is supplied from commercial AC power source 21, converter 6 converts AC power into DC power and outputs the DC power to a DC line L1. At the time of a power outage, in which supply of AC power from commercial AC power source 21 is stopped, the operation of converter 6 is stopped. The output voltage of converter 6 can be controlled into a desired value.

Capacitor 9 is connected to DC line L1 and smooths the voltage in DC line L1. The instantaneous value of DC voltage VDC appearing in DC line L1 is detected by controller 18. Bidirectional chopper 7 has a high-voltage node connected to DC line L1, and a low-voltage node connected to battery terminal T3 via electromagnetic contactor 8.

Electromagnetic contactor 8 is turned on at the time of use of uninterruptible power supply system 1, and is turned off at the time of, for example, maintenance of uninterruptible power supply system 1 and battery 23. The instantaneous value of a voltage VB between the terminals of battery 23 appearing at battery terminal T3 is detected by controller 18.

Bidirectional chopper 7 is controlled by controller 18. At normal times, in which AC power is supplied from commercial AC power source 21, bidirectional chopper 7 supplies DC power generated by converter 6 to battery 23 for storage therein. At the time of a power outage, in which supply of AC power from commercial AC power source 21 is stopped, bidirectional chopper 7 supplies DC power from battery 23 to inverter 10 via DC line L1.

When bidirectional chopper 7 supplies DC power to battery 23 for storage therein, bidirectional chopper 7 steps down DC voltage VDC in DC line L1, and provides the stepped-down voltage to battery 23. When bidirectional chopper 7 supplies DC power from battery 23 to inverter 10, bidirectional chopper 7 boosts voltage VB between the terminals of battery 23, and outputs the boosted voltage to DC line L1. DC line L1 is connected to the input node of inverter 10.

Inverter 10 is controlled by controller 18, so that inverter 10 converts DC power supplied from converter 6 or bidirectional chopper 7 via DC line L1 into AC power having a commercial frequency, and outputs the AC power. Specifically, at normal times, inverter 10 converts DC power supplied from converter 6 via DC line L1 into AC power; and at the time of a power outage, inverter 10 converts DC power supplied from battery 23 via bidirectional chopper 7 into AC power. The output voltage of inverter 10 can be controlled into a desired value.

Inverter 10 has an output node 10a connected to one terminal of reactor 12. The other terminal of reactor 12 (node N2) is connected to AC output terminal T4 via electromagnetic contactor 14. Capacitor 13 is connected to node N2.

Current detector 11 detects the instantaneous value of an output current Io of inverter 10, and provides a signal Iof indicating the detection value to controller 18. The instantaneous value of an AC output voltage Vo appearing at node N2 is detected by controller 18.

Reactor 12 and capacitor 13 form a low-pass filter. The low-pass filter allows
AC power having a commercial frequency generated at inverter 10 to pass to AC output terminal T4, and blocks a signal having a switching frequency generated at inverter 10 from passing to AC output terminal T4.

Electromagnetic contactor 14 is controlled by controller 18 to be turned on in the inverter power supply mode, and to be turned off in the bypass power supply mode. In this specification, electromagnetic contactor 14 is also referred to as an "output switch" for supplying the output power of inverter 10 to load 24. Electromagnetic contactor 14 corresponds to an example of the "first switch".

Semiconductor switch 15, which includes thyristors, is connected between bypass input terminal T2 and AC output terminal T4. Semiconductor switch 15 is controlled by controller 18 to be turned off in the inverter power supply mode, and to be turned on in the bypass power supply mode. Semiconductor switch 15 corresponds to an example of the "second switch". For example, a failure of inverter 10 occurring in the inverter power supply mode immediately turns on semiconductor switch 15, thereby supplying AC power from bypass AC power source 22 to load 24. The instantaneous value of an AC input voltage Vi2 appearing at node N3 between bypass input terminal T2 and semiconductor switch 15 is detected by controller 18. The instantaneous values of AC input voltage Vi2 and AC output voltage Vo are used to determine whether or not the voltage of bypass AC power source 22 and the output voltage of inverter 10 are synchronized.

Operation unit 17 includes, for example, a plurality of buttons to be operated by the user of uninterruptible power supply system 1, and an image display that displays various pieces of information. The user can operate operation unit 17 to power on and off uninterruptible power supply system 1 and select any one of the bypass power supply mode and the inverter power supply mode.

Controller 18 controls the overall uninterruptible power supply system 1 based on, for example, the signal from operation unit 17, AC input voltages Vi, Vi2, AC input current Ii, DC voltage VDC, battery voltage VB, AC output current Io, and AC output voltage Vo. Specifically, controller 18 determines whether or not a power outage has occurred based on the detection value of AC input voltage Vi, and controls converter 6 and inverter 10 in synchronization with the phase of AC input voltage Vi.

Controller 18 controls converter 6 so that, at normal times, in which AC power is supplied from commercial AC power source 21, DC voltage VDC will be a desired target voltage VDCT; and at the time of a power outage, in which supply of AC power from commercial AC power source 21 is stopped, the operation of converter 6 is stopped.

Controller 18 also controls bidirectional chopper 7 so that, at normal times, battery voltage VB will be a desired target battery voltage VBT; and at the time of a power outage, DC voltage VDC will be desired target voltage VDCT.

Figure 2:
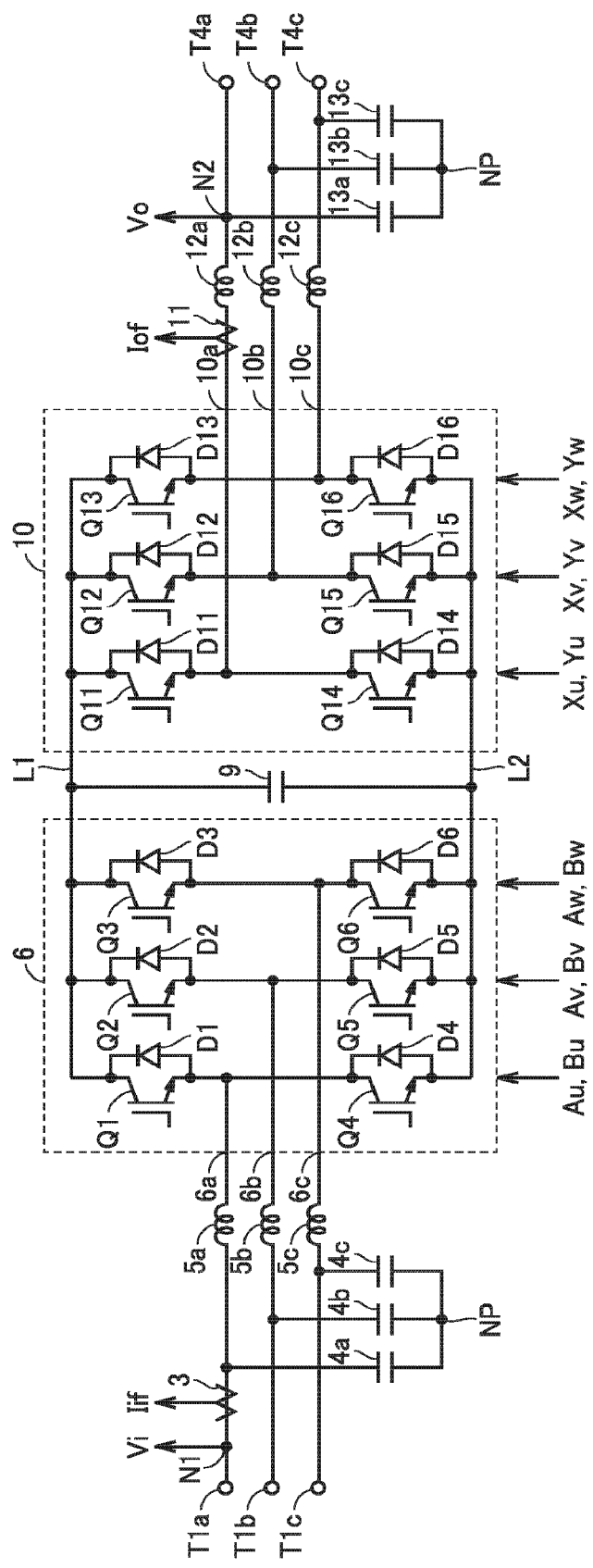
FIG. 2 is a circuit diagram showing the major portion of the uninterruptible power supply system shown in FIG. 1.

FIG. 2 is a circuit diagram showing the major portion of uninterruptible power supply system 1 shown in FIG. 1. Although FIG. 1 shows a portion related to only a single phase of a three-phase AC voltage, FIG. 2 shows a portion related to three phases. FIG. 2 does not show electromagnetic contactors 2, 14, semiconductor switch 15, operation unit 17, and controller 18.

In FIG. 2, uninterruptible power supply system 1 includes AC input terminals T1a, T1b, T1c; AC output terminals T4a, T4b, T4c; current detectors 3, 11; capacitors 4a, 4b, 4c, 13a, 13b, 13c; reactors 5a, 5b, 5c, 12a, 12b, 12c; converter 6; DC lines L1, L2; and inverter 10.

AC input terminals T1a, T1b, and T1c respectively receive AC voltages in three phases (U-, V-, and W-phases) from commercial AC power source 21 (FIG. 1). AC voltages in three phases respectively synchronized with AC voltages in three phases from commercial AC power source 21 are output to AC output terminals T4a, T4b, T4c. The AC voltages in three phases from AC output terminals T4a, T4b, T4c are used to drive load 24.

Reactors 5a, 5b, 5c each have one terminal connected to a corresponding one of AC input terminals T1a, T1b, T1c; and the other terminal connected to a corresponding one of input nodes 6a, 6b, 6c of converter 6. Capacitors 4a, 4b, 4c each have one electrode connected to one terminal of a corresponding one of reactors 5a, 5b, 5c; and the other electrode connected to a neutral point NP.

Capacitors 4a, 4b, 4c and reactors 5a, 5b, 5c form a low-pass filter. The low-pass filter allows three-phase AC power having a commercial frequency from AC input terminals T1a, T1b, T1c to pass to converter 6, and blocks a signal having a switching frequency generated at converter 6. The instantaneous value of AC input voltage Vi appearing at one terminal of reactor 5a is detected by controller 18 (FIG. 1). Current detector 3 detects AC input current Ii flowing through node N1 (i.e., AC input terminal T1a), and provides signal Iif indicating the detection value to controller 18.

Converter 6 includes insulated gate bipolar transistors (IGBTs) Q1 to Q6 and diodes D1 to D6. The IGBTs correspond to the "switching elements". IGBTs Q1, Q2, Q3 have their respective collectors all connected to DC line L1, and have their respective emitters connected to input nodes 6a, 6b, 6c. IGBTs Q4, Q5, Q6 have their respective collectors connected to input nodes 6a, 6b, 6c, and have their respective emitters all connected to DC line L2. Diodes D1 to D6 are connected in antiparallel to IGBTs Q1 to Q6, respectively.

IGBTs Q1, Q4 are respectively controlled by gate signals Au, Bu; IGBTs Q2, Q5 are respectively controlled by gate signals Av, Bv; and IGBTs Q3, Q6 are respectively controlled by gate signals Aw, Bw. Gate signals Bu, Bv, Bw are respectively inverted signals of gate signals Au, Av, Aw.

IGBTs Q1, Q2, Q3 are respectively turned on when gate signals Au, Av, Aw transition to the "logical high (H)" level, and are respectively turned off when gate signals Au, Av, Aw transition to the "logical low (L)" level. IGBTs Q4, Q5, Q6 are respectively turned on when gate signals Bu, Bv, Bw transition to the "H" level, and are respectively turned off when gate signals Bu, Bv, Bw transition to the "L" level.

Each of gate signals Au, Bu, Av, Bv, Aw, Bw, which is a train of pulse signals, is a pulse width modulation (PWM) signal. Gate signals Au, Bu; gate signals Av, Bv; and gate signals Aw, Bw are shifted in phase by 120° relative to each other. Gate signals Au, Bu, Av, Bv, Aw, Bw are generated by controller 18.

For example, when AC input terminal T1*a* has a higher voltage level than AC input terminal T1*b*, IGBTs Q1, Q5 are turned on. In this case, a current flows from AC input terminal T1*a* through reactor 5*a*, IGBT Q1, DC line L1, capacitor 9, DC line L2, IGBT Q5, and reactor 5*b* to AC input terminal T1*b*, so that capacitor 9 is charged with a positive voltage.

When AC input terminal T1*b* has a higher voltage level than AC input terminal T1*a*, IGBTs Q2, Q4 are turned on. In this case, a current flows from AC input terminal T1*b* through reactor 5*b*, IGBT Q2, DC line L1, capacitor 9, DC line L2, IGBT Q4, and reactor 5*a* to AC input terminal T1*a*, so that capacitor 9 is charged with a positive voltage. Similar things apply for other cases.

A three-phase AC voltage provided to input nodes 6*a*, 6*b*, 6*c* can be converted into a DC voltage VDC (a voltage between the terminals of capacitor 9) by turning on and off IGBTs Q1, Q2, Q3, Q4, Q5, Q6 via gate signals Au, Bu, Av, Bv, Aw, Bw at predetermined timings, and adjusting the "on" time of IGBTs Q1, Q2, Q3, Q4, Q5, Q6.

Inverter 10 includes IGBTs Q11 to Q16 and diodes D11 to D16. The IGBTs correspond to the "switching elements". IGBTs Q11, Q12, Q13 have their respective collectors all connected to DC line L1, and have their respective emitters connected to output nodes 10*a*, 10*b*, 10*c*. IGBTs Q14, Q15, Q16 have their respective collectors connected to output nodes 10*a*, 10*b*, 10*c*, and have their respective emitters all connected to DC line L2. Diodes D11 to D16 are connected in antiparallel to IGBTs Q11 to Q16, respectively.

IGBTs Q11, Q14 are respectively controlled by gate signals Xu, Yu; IGBTs Q12, Q15 are respectively controlled by gate signals Xv, Yv; and IGBTs Q13, Q16 are respectively controlled by gate signals Xw, Yw. Gate signals Yu, Yv, Yw are respectively inverted signals of gate signals Xu, Xv, Xw.

IGBTs Q11, Q12, Q13 are respectively turned on when gate signals Xu, Xv, Xw transition to the H level, and are respectively turned off when gate signals Xu, Xv, Xw transition to the L level. IGBTs Q14, Q15, Q16 are respectively turned on when gate signals Yu, Yv, Yw transition to the H level, and are respectively turned off when gate signals Yu, Yv, Yw transition to the L level.

Each of gate signals Xu, Yu, Xv, Yv, Xw, Yw, which is a train of pulse signals, is a PWM signal. Gate signals Xu, Yu; gate signals Xv, Yv; and gate signals Xw, Yw are shifted in phase by 120° relative to each other. Gate signals Xu, Yu, Xv, Yv, Xw, Yw are generated by controller 18.

For example, when IGBTs Q11, Q15 are turned on, positive DC line L1 is connected to output node 10*a* via IGBT Q11, and negative DC line L2 is connected to output node 10*b* via IGBT Q15. This causes a positive voltage to be output between output nodes 10*a*, 10*b*.

When IGBTs Q12, Q14 are turned on, positive DC line L1 is connected to output node 10*b* via IGBT Q12, and negative DC line L2 is connected to output node 10*a* via IGBT Q14. This causes a negative voltage to be output between output nodes 10*a*, 10*b*.

A DC voltage between DC lines L1 and L2 can be converted into a three-phase AC voltage by turning on and off IGBTs Q11, Q12, Q13, Q14, Q15, Q16 via gate signals Xu, Yu, Xv, Yv, Xw, Yw at predetermined timings, and adjusting the "on" time of IGBTs Q11, Q12, Q13, Q14, Q15, Q16.

Reactors 12*a*, 12*b*, 12*c* each have one terminal connected to a corresponding one of output nodes 10*a*, 10*b*, 10*c* of inverter 10; and the other terminal connected to a corresponding one of AC output terminals T4*a*, T4*b*, T4*c*. Capacitors 13*a*, 13*b*, 13*c* each have one electrode connected to the other terminal of a corresponding one of reactors 12*a*, 12*b*, 12*c*; and the other electrode connected to neutral point NP.

Reactors 12*a*, 12*b*, 12*c* and capacitors 13*a*, 13*b*, 13*c* form a low-pass filter. The low-pass filter allows three-phase AC power having a commercial frequency from inverter 10 to pass to AC output terminals T4*a*, T4*b*, T4*c*, and blocks a signal having a switching frequency generated at inverter 10.

Current detector 11 detects AC output current Io flowing through reactor 12*a*, and provides signal Iof indicating the detection value to controller 18. The instantaneous value of AC output voltage Vo appearing at the other terminal of reactor 12*a* (node N2) is detected by controller 18 (FIG. 1).

Figure 3:
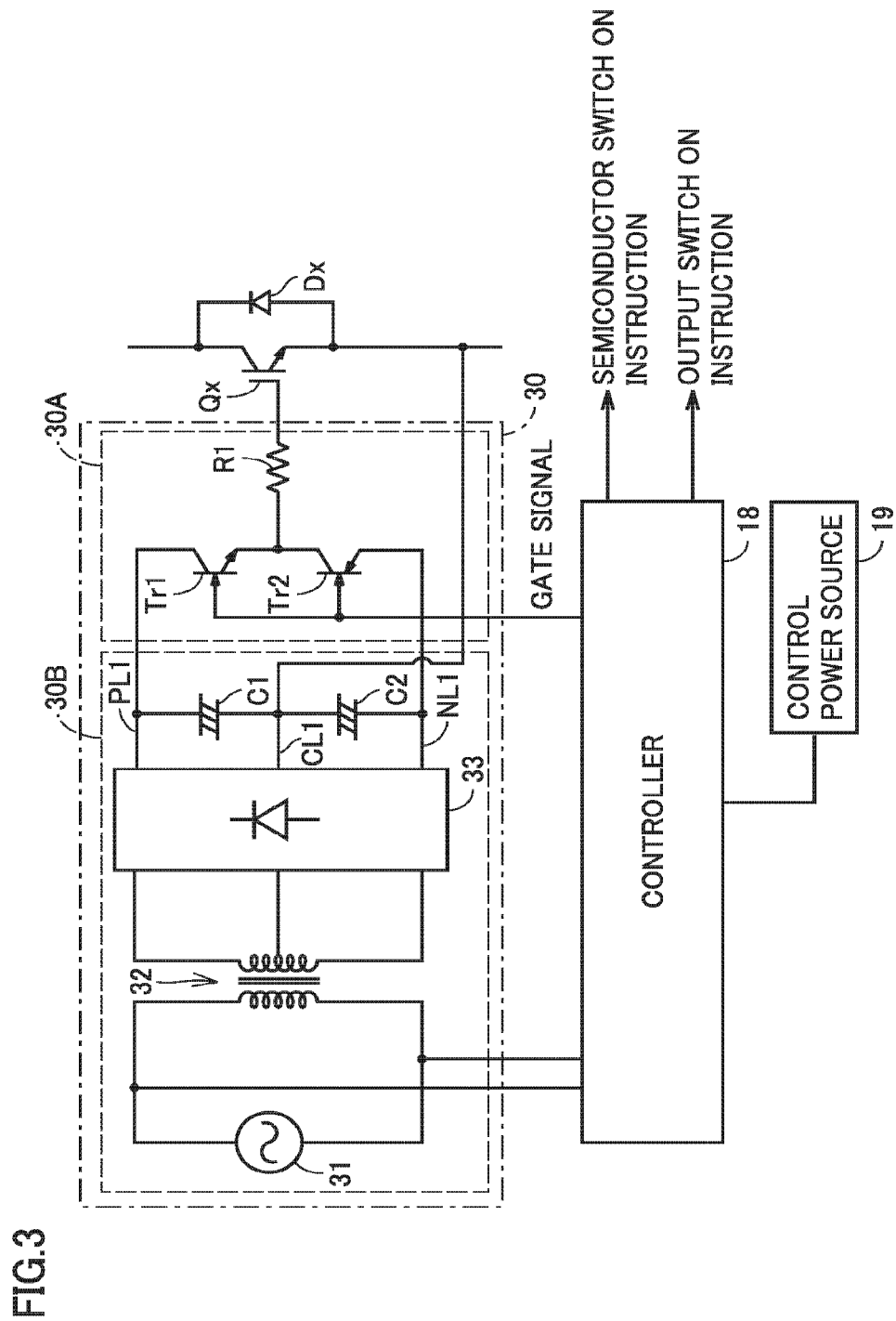
FIG. 3 is a block diagram showing a configuration of a portion related to control of a switching element in each of the converter and inverter shown in FIG. 1.

FIG. 3 is a block diagram showing a configuration of a portion related to control of a switching element in each of converter 6 and inverter 10 shown in FIG. 1. In FIG. 3, IGBTs Q1 to Q6 in converter 6 and IGBTs Q11 to Q16 in inverter 10 are generically referred to as IGBT Qx.

With reference to FIG. 3, IGBT Qx is connected to a gate drive circuit 30. Gate drive circuit 30 includes a gate driver 30A that drives IGBT Qx in accordance with a gate signal from controller 18, and a power source circuit 30B that supplies power to gate driver 30A.

Power source circuit 30B converts AC power supplied from AC power source 31 into a DC voltage, and outputs the DC voltage to DC buses PL1, NL1. AC power source 31 is typically a commercial AC power source that supplies an AC voltage having a predetermined frequency (e.g., 50 or 60 Hz). The DC voltage output from power source circuit 30B is hereinafter also simply referred to as an output voltage. The output voltage is supplied to gate driver 30A electrically connected between DC positive bus PL1 and DC negative bus NL1.

The configuration of power source circuit 30B will now be described. Power source circuit 30B includes AC power source 31, a transformer 32, a rectifier 33, DC positive bus PL1, DC negative bus NL1, a DC neutral point bus CL1, and smoothing capacitors C1, C2.

Transformer 32 includes a primary winding and a secondary winding. The primary winding is electrically connected to AC power source 31. The AC voltage supplied from AC power source 31 is applied to the primary winding. The amplitude of the AC voltage is converted in accordance with the turn ratio between the primary winding and the secondary winding, and the AC voltage with the converted amplitude is output to the secondary winding. The AC voltage output to the secondary winding has the same frequency as the AC voltage of the primary winding.

Rectifier 33 has a diode bridge. Rectifier 33 performs full-wave rectification of the AC voltage output to the secondary winding of transformer 32, and outputs the rectified AC voltage to DC positive bus PL1 and DC negative bus NL1.

Smoothing capacitors C1, C2 are connected in series between DC positive bus PL1 and DC negative bus NL1. Smoothing capacitors C1, C2 are, for example, electrolytic capacitors. Smoothing capacitors C1, C2 smooth the voltage rectified by rectifier 33. Smoothing capacitors C1, C2 thus allow the voltage between DC positive bus PL1 and DC negative bus NL1 to be maintained at a DC voltage corresponding to the amplitude of the output voltage from the secondary winding of transformer 32. Thus, power from AC power source 31 can provide a source voltage to gate driver 30A. The connection point between smoothing capacitors C1 and C2 is connected to DC neutral point bus CL1. DC neutral point bus CL1 is electrically connected to the emitter of IGBT Qx.

The configuration of gate driver 30A will now be described. Gate driver 30A includes an npn transistor Tr1, a pnp transistor Tr2, and a gate resistor R1. Npn transistor Tr1 has a collector connected to DC positive bus PL1, and an emitter connected to the collector of pnp transistor Tr2. Pnp transistor Tr2 has an emitter connected to DC negative bus NL1. Gate resistor R1 is electrically connected between the connection point between npn transistor Tr1 and pnp transistor Tr2, and the gate electrode of IGBT Qx.

Npn transistor Tr1 and pnp transistor Tr2 have a control electrode (base) to receive a gate signal applied by controller 18. Npn transistor Tr1 and pnp transistor Tr2 are complementarily turned on and off in accordance with the gate signal. Specifically, while the gate signal is at the H level, npn transistor Tr1 is ON and pnp transistor Tr2 is OFF. During this time, a drive current for charging the gate electrode of IGBT Qx is supplied from DC positive bus PL1 to the gate electrode through npn transistor Tr1. The charging path via gate resistor R1 causes the gate electrode to be driven to the higher potential. This cause the gate-source voltage of IGBT Qx to exceed a threshold voltage, in response to which IGBT Qx is turned on.

While the gate signal is at the L level, npn transistor Tr1 is OFF and pnp transistor Tr2 is ON. This forms a discharging path extending from the gate electrode of IGBT Qx to DC negative bus NL1 via gate resistor R1, and causes the gate-source voltage to drop below the threshold voltage, in response to which IGBT Qx is turned off.

In this way, gate driver 30A can receive power supply from power source circuit 30B to turn on and off IGBT Qx in accordance with the gate signal supplied from controller 18.

Controller 18 generates a gate signal for IGBT Qx included in each of converter 6 and inverter 10, generates a control instruction for controlling the on and off of semiconductor switch 15 (second switch) (hereinafter also referred to as a "semiconductor switch ON instruction"), and generates a control instruction for controlling the on and off of output switch 14 (first switch) (hereinafter also referred to as an "output switch ON instruction").

Semiconductor switch 15 is turned on when the semiconductor switch ON instruction transitions to the H level, and is turned off when the semiconductor switch ON instruction transitions to the L level. Output switch 14 is turned on when the output switch ON instruction transitions to the H level, and is turned off when the output switch ON instruction transitions to the L level.

Specifically, in the inverter power supply mode, controller 18 generates an H-level output switch ON instruction and generates an L-level semiconductor switch ON instruction. While output switch 14 is ON, AC power generated by inverter 10 is supplied to load 24.

In the bypass power supply mode, controller 18 generates an H-level semiconductor switch ON instruction and generates an L-level output switch ON instruction. While semiconductor switch 15 is ON, AC power from bypass AC power source 22 is supplied to load 24.

Controller 18 is further configured to detect an abnormality of AC power source 31 in gate drive circuit 30 in the inverter power supply mode. Upon detecting an abnormality of AC power source 31, controller 18 shifts the output switch ON instruction from the H level to the L level, and shifts the semiconductor switch ON instruction from the L level to the H level. This causes uninterruptible power supply system 1 to shift from the inverter power supply mode to the bypass power supply mode. Uninterruptible power supply system 1 can thus uninterruptedly supply power to load 24 even after an abnormality occurs in AC power source 31.

Controller 18 is powered by a control power source 19, provided separately from AC power source 31. Thus, controller 18 can perform switching between the inverter power supply mode and the bypass power supply mode even with an abnormality of AC power source 31.

However, when an abnormality of AC power source 31 occurs, power source circuit 30B cannot properly supply a source voltage to gate driver 30A. This may cause an unsteady potential at the gate electrode of IGBT Qx until semiconductor switch 15 is turned on. IGBT Qx may thus malfunction, such as being erroneously turned on or erroneously turned off.

Figure 4:
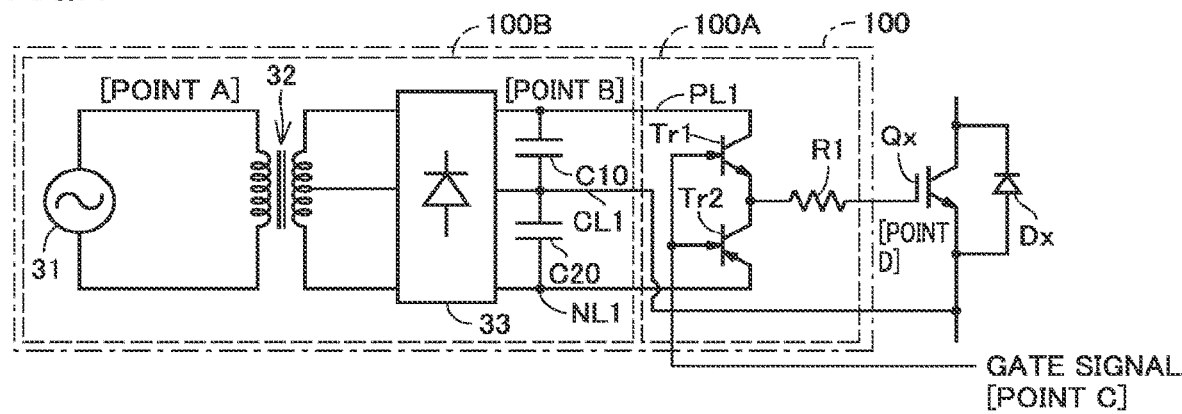
FIG. 4 is a block diagram showing a configuration of a gate drive circuit according to a comparative example.
Figure 5:
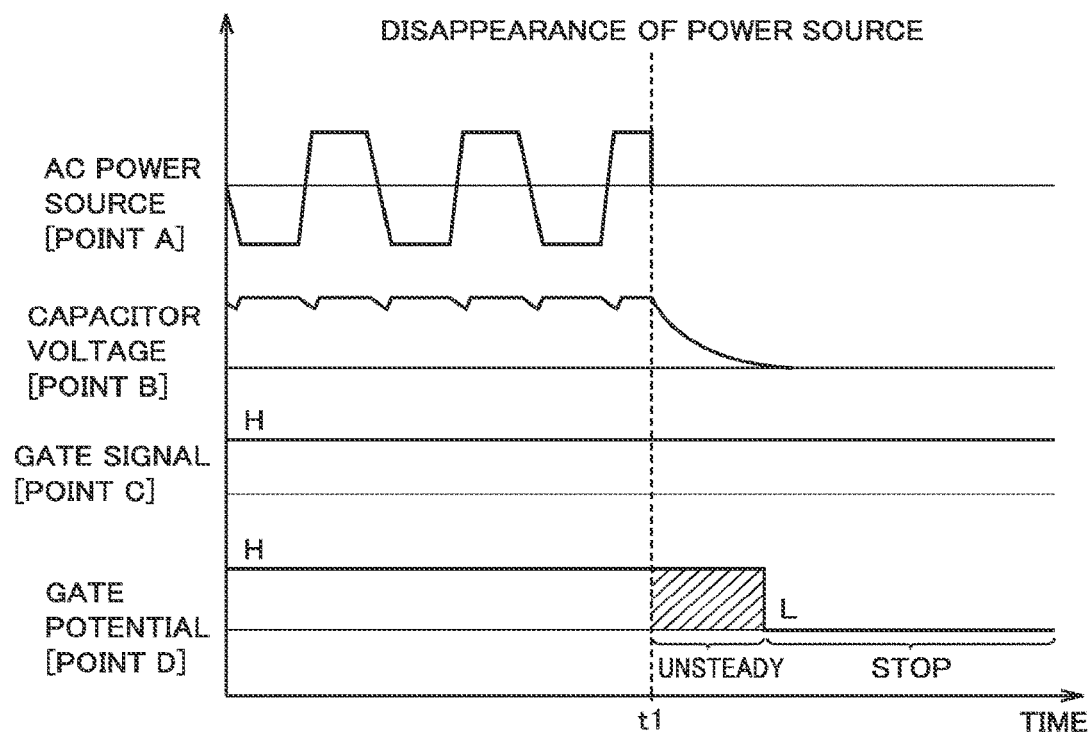
FIG. 5 is a waveform chart schematically showing the temporal changes in potential at points A to D in FIG. 4 when an abnormality occurs in an AC power source for a gate drive circuit according to the comparative example.

With reference to FIGS. 4 and 5, the problems associated with an abnormality of an AC power source in a gate drive circuit according to a comparative example will now be described.

FIG. 4 shows a gate drive circuit 100 according to a comparative example. Gate drive circuit 100 according to the comparative example includes a gate driver 100A and a power source circuit 100B, as with gate drive circuit 30 shown in FIG. 3. Gate driver 100A and power source circuit 100B are respectively similar in configuration to gate driver 30A and power source circuit 30B shown in FIG. 3, except for smoothing capacitors C10, C20. Smoothing capacitors C10, C20 are film capacitors, for example.

In gate drive circuit 100 shown in FIG. 4, one end of the primary winding of transformer 32 is denoted by "point A", the connection point between DC positive bus PL1 and one end of smoothing capacitor C10 is denoted by "point B", the control electrode of npn transistor Tr1 in gate driver 100A is denoted by "point C", and the gate electrode of IGBT Qx is denoted by "point D".

FIG. 5 is a waveform chart schematically showing the temporal changes in potential at points A to D in FIG. 4 when an abnormality occurs in AC power source 31 for gate drive circuit 100 according to the comparative example.

With reference to FIG. 5, the potential at point A shows the power source potential supplied from AC power source 31. The potential at point B shows the potential in DC positive bus PL1. The potential at point C shows the potential of the gate signal supplied from controller 18. The potential at point D shows the potential at the gate electrode of IGBT Qx. In the example of FIG. 5, the control electrode of npn transistor Tr1 and pnp transistor Tr2 is receiving input of an H-level gate signal from a controller (not shown).

When AC power source 31 is normal, the AC voltage supplied from AC power source 31 undergoes amplitude conversion at transformer 32, then undergoes full-wave rectification at rectifier 33, and is then output to DC positive bus PL1. The potential in DC positive bus PL1 (point B) is smoothed by smoothing capacitor C10 and maintained at a DC voltage having an amplitude proportional to the amplitude of the power source potential (point A). Npn transistor Tr1, when receiving an H-level gate signal (point C) at its control electrode, is turned on. This causes the potential at the gate electrode of IGBT Qx (point D) to be driven to an H-level potential corresponding to the potential in DC positive bus PL1. IGBT Qx, in response to its gate-source voltage exceeding a threshold voltage, is turned on.

Here, suppose an abnormality, disappearance of the source voltage from AC power source 31, occurs at time t1.

When AC voltage supply from AC power source 31 is stopped, energy accumulated in smoothing capacitor C10 is released, causing a gradual decrease in the potential in DC positive bus PL1 (point B) after time t1. The collector-emitter voltage of npn transistor Tr1 is gradually decreased, accordingly.

Meanwhile, the control electrode of npn transistor Tr1 is receiving input of an H-level gate signal (point C). However, npn transistor Tr1, with its collector-emitter voltage decreasing, cannot be maintained in the on-state, causing an unsteady gate potential of IGBT Qx. When the collector-emitter voltage of npn transistor Tr1 reaches 0, the gate potential transitions to the L level (grounding potential) to turn off IGBT Qx.

Thus, in gate drive circuit 100 according to the comparative example, an abnormality of the power source may cause an unsteady gate potential of IGBT Qx, leading to malfunctions of IGBT Qx. This may cause malfunctions of converter 6 or inverter 10 during the period from time t1 at which the abnormality of the power source occurs to the time at which the uninterruptible power supply system shifts from the inverter power supply mode to the bypass power supply mode.

In uninterruptible power supply system 1 according to the present embodiment, controller 18 and gate drive circuit 30 are configured to maintain the gate potential of IGBT Qx during the period from when an abnormality of the power source for gate drive circuit 30 is detected to when semiconductor switch 15 is turned on. This allows uninterruptible power supply system 1 to shift to the bypass power supply mode without causing malfunctions of IGBT Qx.

Figure 6:
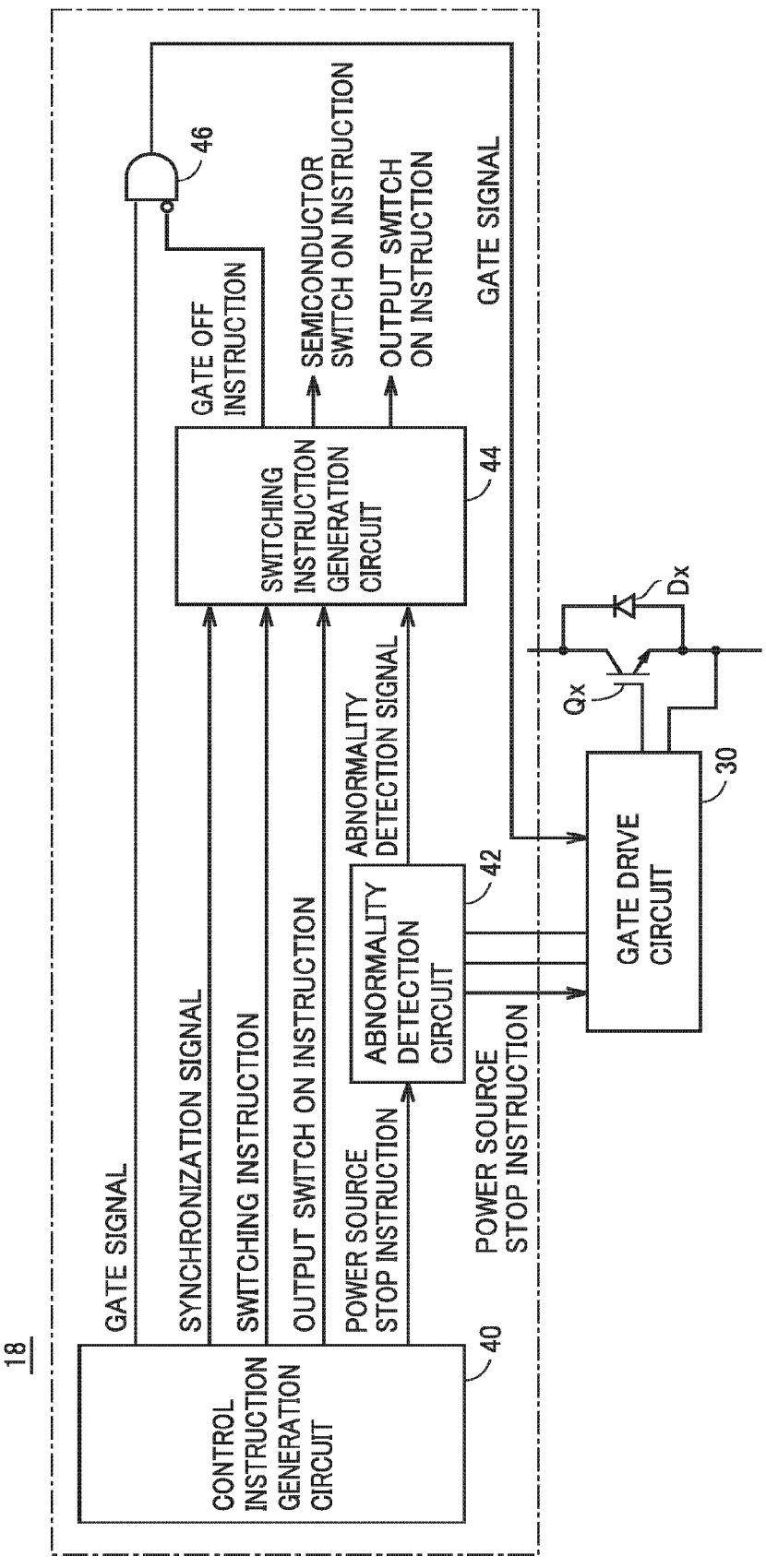
FIG. 6 is a block diagram showing a configuration of a portion of the controller shown in FIG. 3 related to control of an IGBT.

FIG. 6 is a block diagram showing a configuration of a portion of controller 18 shown in FIG. 3 related to control of IGBT Qx.

With reference to FIG. 6, controller 18 includes a control instruction generation circuit 40, an abnormality detection circuit 42, a switching instruction generation circuit 44, and an AND circuit 46.

Control instruction generation circuit 40 generates a control instruction for controlling the operation of uninterruptible power supply system 1. This control instruction includes a gate signal for controlling the on and off of each IGBT Qx included in converter 6 and inverter 10, a synchronization signal, a switching instruction, an output switch ON instruction, and a power source stop instruction.

The gate signal includes gate signals Au, Bu, Av, Bv, Aw, Bw and gate signals Xu, Yu, Xv, Yv, Xw, Yw shown in FIG. 2. Each gate signal, which is a train of pulse signals, is a PWM signal.

The synchronization signal is a signal indicating whether or not the AC voltage generated by inverter 10 is synchronized with the AC voltage supplied from bypass AC power source 22. When the output voltage of inverter 10 is synchronized with the voltage of bypass AC power source 22, the synchronization signal is at the H level. When the output voltage of inverter 10 is not synchronized with the voltage of bypass AC power source 22, the synchronization signal is at the L level.

The switching instruction is a control instruction for switching the operation mode of uninterruptible power supply system 1 between the inverter power supply mode and the bypass power supply mode. The switching instruction is generated based on an operation on operation unit 17 (FIG. 1). When the user operates operation unit 17 to select the inverter power supply mode, an L-level switching instruction is generated; whereas when the user operates operation unit 17 to select the bypass power supply mode, an H-level switching instruction is generated.

The output switch ON instruction is a control instruction for controlling the on and off of output switch 14. An H-level output switch ON instruction turns on output switch 14, whereas an L-level output switch ON instruction turns off output switch 14. When the user operates operation unit 17 to select the inverter power supply mode, control instruction generation circuit 40 generates an L-level switching instruction and an H-level output switch ON instruction.

The power source stop instruction is a control instruction for controlling the execution and stop of power supply from power source circuit 30B to gate driver 30A in gate drive circuit 30. The power source stop instruction is generated based on an operation on operation unit 17 (FIG. 1). When the user operates operation unit 17 to turn on the power source of uninterruptible power supply system 1, an L-level power source stop instruction is generated; whereas when the user operates operation unit 17 to turn off the power source of uninterruptible power supply system 1, an H-level power source stop instruction is generated. While the power source stop instruction is at the L level, power is supplied from power source circuit 30B to gate driver 30A. When the power source stop instruction transitions to the H level, power supply from power source circuit 30B to gate driver 30A is stopped.

Abnormality detection circuit 42 is configured to detect an abnormality of AC power source 31 in gate drive circuit 30. Abnormality detection circuit 42 detects the AC voltage supplied from AC power source 31, and uses the detection value to determine whether AC power source 31 is normal or abnormal. When determining that AC power source 31 is normal, abnormality detection circuit 42 generates an L-level abnormality detection signal; whereas when determining that AC power source 31 is abnormal, abnormality detection circuit 42 generates an H-level abnormality detection signal.

Further, abnormality detection circuit 42 outputs an H-level power source stop instruction to gate drive circuit 30 upon receiving an H-level power source stop instruction from control instruction generation circuit 40 or upon detecting an abnormality of AC power source 31. Gate drive circuit 30, upon receiving the H-level power source stop instruction, stops power supply from power source circuit 30B to gate driver 30A.

Switching instruction generation circuit 44 receives the synchronization signal, the switching instruction, and the output switch ON instruction from control instruction generation circuit 40, and receives the abnormality detection signal from abnormality detection circuit 42. Based on these input signals, switching instruction generation circuit 44 controls the on and off of output switch 14 and semiconductor switch 15, and controls the on and off of each IGBT Qx included in converter 6 and inverter 10.

Specifically, switching instruction generation circuit 44 generates a semiconductor switch ON instruction, an output switch ON instruction, and a gate OFF instruction, based on the synchronization signal, the switching instruction, the output switch ON instruction, and the abnormality detection signal. The gate OFF instruction is a control instruction for forcibly turning off IGBT Qx. To turn off IGBT Qx, switching instruction generation circuit 44 shifts the gate OFF instruction to the active H level.

AND circuit 46 receives the gate OFF instruction and the gate signal, and performs a logical operation to calculate the AND of them. AND circuit 26 provides the logical operation result to gate drive circuit 30 (gate driver 30A) as a gate signal.

AND circuit 46 has a first input terminal that receives input of the gate signal, and a second input terminal that receives input of an inverted signal of the gate OFF instruction. When the gate OFF instruction is at the L level, a gate signal corresponding to the gate signal generated by control instruction generation circuit 40 is input from AND circuit 46 to gate drive circuit 30. When the gate OFF instruction is at the H level, an L-level gate signal is input to gate drive circuit 30 regardless of the gate signal generated by control instruction generation circuit 40. In other words, when the gate OFF instruction transitions to the active H level, the gate signal is forcibly driven to the L level, thereby forcibly turning off IGBT Qx.

Figure 7:
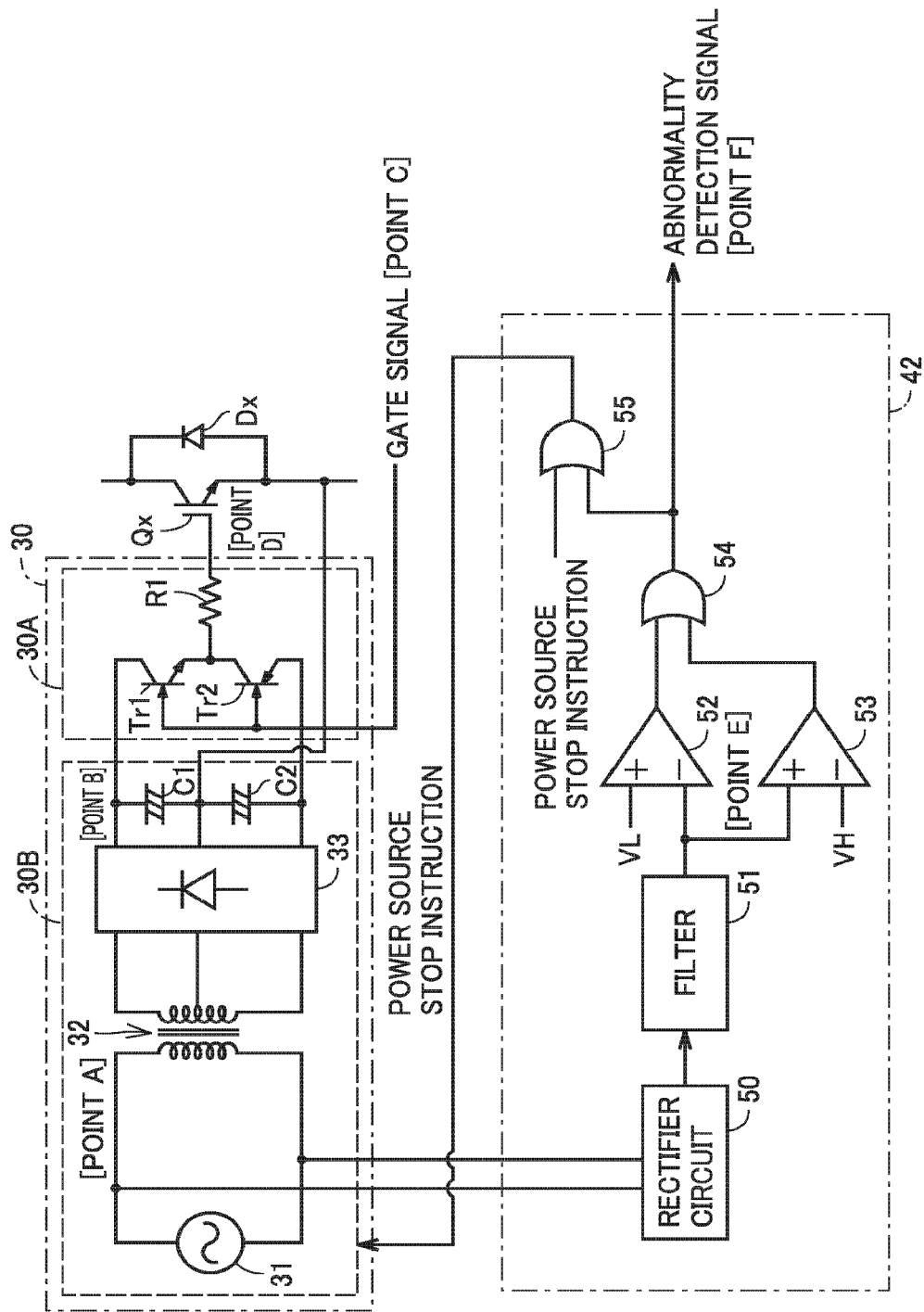
FIG. 7 is a block diagram showing a configuration of the abnormality detection circuit shown in FIG. 6.

FIG. 7 further illustrates a configuration of abnormality detection circuit 42 shown in FIG. 6.

With reference to FIG. 7, abnormality detection circuit 42 includes a rectifier circuit 50, a filter 51, comparators 52, 53, and OR circuits 54, 55.

Rectifier circuit 50 performs full-wave rectification of the AC voltage from AC power source 31, and outputs the rectified AC voltage to filter 51. Filter 51 filters out a high-frequency component from the voltage rectified by rectifier circuit 50. The output voltage of filter 51 is maintained at a DC voltage corresponding to the amplitude of the AC voltage from AC power source 31. Rectifier circuit 50 and filter 51 form the "voltage detector" for detecting the amplitude of the supply voltage from AC power source 31.

Comparator 52 compares the amplitude of the supply voltage from AC power source 31 with a first reference value VL, and outputs a signal indicating the comparison result. First reference value VL is set to the amplitude of the supply voltage of when AC power source 31 is excessively low (including when the power source has disappeared). When the amplitude of the supply voltage is higher than first reference value VL, the output signal from comparator 52 is at the L level. When the amplitude of the supply voltage is not higher than first reference value VL, the output signal from comparator 52 is at the H level.

Comparator 53 compares the amplitude of the supply voltage with a second reference value VH, and outputs a signal indicating the comparison result. Second reference value VH is set to the amplitude of the supply voltage of when AC power source 31 is excessively high. When the amplitude of the supply voltage is higher than second reference value VH, the output signal from comparator 53 is at the H level. When the amplitude of the supply voltage is not higher than second reference value VH, the output signal from comparator 53 is at the L level.

OR circuit 54 receives the output signal from comparator 52 and the output signal from comparator 53, and performs a logical operation to calculate the OR of them. The logical operation result from OR circuit 54 is the H level when any one of the output signal from comparator 52 and the output signal from comparator 53 is at the H level, i.e., when the amplitude of the supply voltage is not higher than first reference value VL or higher than second reference value VH. OR circuit 54 outputs the logical operation result to switching instruction generation circuit 44 (FIG. 6) as an abnormality detection signal. In this way, when the supply voltage from AC power source 31 is excessively high or low, abnormality detection circuit 42 determines that AC power source 31 of gate drive circuit 30 is abnormal, and outputs an H-level abnormality detection signal to switching instruction generation circuit 44.

When the amplitude of the supply voltage from AC power source 31 is higher than first reference value VL and is not higher than second reference value VH, the logical operation result from OR circuit 54 is the L level. In this case, abnormality detection circuit 42 determines that AC power source 31 of gate drive circuit 30 is normal, and thus outputs an L-level abnormality detection signal to switching instruction generation circuit 44.

OR circuit 55 receives the abnormality detection signal output from OR circuit 54 and the power source stop instruction output from control instruction generation circuit 40, and performs a logical operation to calculate the OR of them. The logical operation result from OR circuit 55 is output to gate drive circuit 30 as a power source stop instruction. Gate drive circuit 30 receives an H-level power source stop instruction when an H-level power source stop instruction is generated by control instruction generation circuit 40 or an H-level abnormality detection signal is generated by abnormality detection circuit 42 (corresponding to when an abnormality of AC power source 31 is detected). Gate drive circuit 30, upon receiving the H-level power source stop instruction, stops power supply from power source circuit 30B to gate driver 30A.

Figure 8:
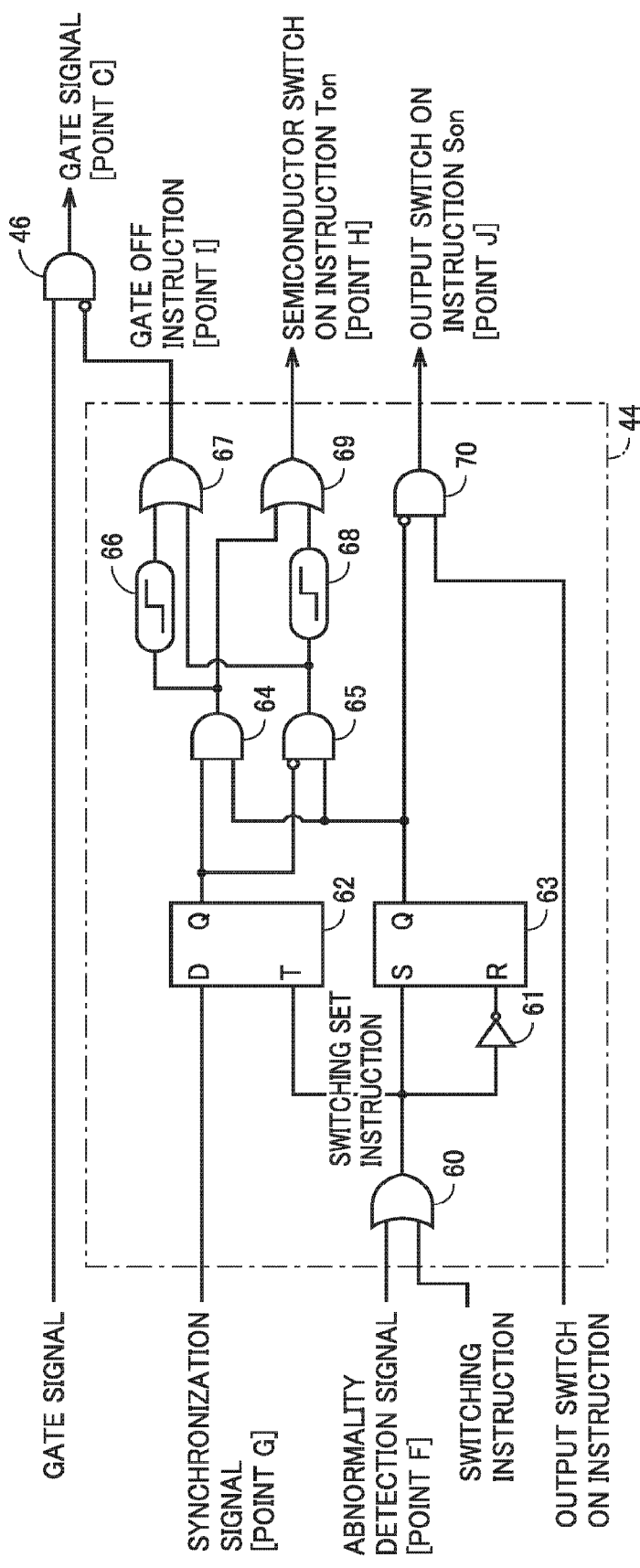
FIG. 8 is a block diagram showing a configuration of the switching instruction generation circuit shown in FIG. 6.

FIG. 8 further illustrates a configuration of switching instruction generation circuit 44 shown in FIG. 6.

With reference to FIG. 8, switching instruction generation circuit 44 includes OR circuits 60, 67, 69, an inversion device 61, a D flip-flop 62, an RS flip-flop 63, AND circuits 64, 65, 70, and on-delay circuits 66, 68.

OR circuit 60 receives the abnormality detection signal from abnormality detection circuit 42 (FIG. 7) and receives the switching instruction from control instruction generation circuit 40 (FIG. 6), and performs a logical operation to calculate the OR of them. The logical operation result from OR circuit 60 is the H level when the abnormality detection signal is at the H level (i.e., when an abnormality of the power source for gate drive circuit 30 is detected), or when the switching instruction is at the H level (i.e., when the bypass power supply mode is selected through an operation on operation unit 17 (FIG. 1)). The logical operation result from OR circuit 60 is the L level when the switching instruction is at the L level (i.e., when the inverter power supply mode is selected through an operation on operation unit 17) and the abnormality detection signal is at the L level (i.e., when AC power source 31 of gate drive circuit 30 is normal).

RS flip-flop 63 has a set terminal S that receives input of the logical operation result from OR circuit 60 as a switching set instruction. RS flip-flop 63 has a reset terminal R that receives input of an inverted signal of the switching set instruction (switching reset instruction) through inversion device 61. RS flip-flop 63 has an output terminal Q connected to a first input terminal of each of AND circuits 64, 65, 70. To the first input terminal of AND circuit 70, an inverted signal of the output signal from RS flip-flop 63 is input.

With an H-level switching set instruction, RS flip-flop 63 is in a set state and has an H-level output signal. With an L-level switching set instruction, RS flip-flop 63 is in a reset state and has an L-level output signal.

D flip-flop 62 has a trigger terminal T that receives input of the switching set instruction. D flip-flop 62 has a delay terminal D that receives input of the synchronization signal. D flip-flop 62 has an output terminal Q connected to a second input terminal of each of AND circuits 64, 65. To the second input terminal of AND circuit 65, an inverted signal of the output signal from D flip-flop 62 is input. D flip-flop 62 takes in the synchronization signal in response to a rise of the switching set instruction, and outputs the synchronization signal.

AND circuit 64 receives the output signal from D flip-flop 62 and the output signal from RS flip-flop 63, and performs a logical operation to calculate the AND of them. AND circuit 64 outputs an H-level signal when the synchronization signal is at the H level and the switching set instruction is at the H level. AND circuit 64 outputs an L-level signal when the synchronization signal is at the L level or the switching set instruction is at the L level. The output signal from AND circuit 64 is input to the first input terminal of OR circuit 69, and is also input to the first input terminal of OR circuit 67 through on-delay circuit 66. On-delay circuit 66 outputs an H-level signal a predetermined time period after receiving input of an H-level signal.

AND circuit 65 receives an inverted signal of the output signal from D flip-flop 62 and receives the output signal from RS flip-flop 63, and performs a logical operation to calculate the AND of them. AND circuit 65 outputs an H-level signal when the synchronization signal is at the L level and the switching set instruction is at the H level. AND circuit 65 outputs an L-level signal when the synchronization signal is at the 11 level or switching set instruction is at the L level. The output signal from AND circuit 65 is input to the second input terminal of OR circuit 67, and is also input to the second input terminal of OR circuit 69 through on-delay circuit 68. On-delay circuit 68 outputs an H-level signal a predetermined time period after receiving input of an H-level signal.

OR circuit 67 receives the output signal from on-delay circuit 66 and the output signal from AND circuit 65, and performs a logical operation to calculate the OR of them. OR circuit 67 outputs an H-level signal when the output signal from on-delay circuit 66 is at the H level or the output signal from AND circuit 65 is at the H level. OR circuit 67 outputs an L-level signal when the output signal from on-delay circuit 66 is at the L level and the output signal from AND circuit 65 is at the L level. The output signal from OR circuit 67 is input to the first input terminal of AND circuit 46 as a gate OFF instruction.

The gate OFF instruction is at the H level when the synchronization signal is at the H level and the switching set instruction is at the H level, or when the synchronization signal is at the L level and the switching set instruction is at the H level. When the synchronization signal is at the H level and the switching set instruction is at the H level, the gate OFF instruction transitions to the H level a predetermined time period after the transition of the switching set instruction to the H level.

AND circuit 46 receives the gate signal and an inverted signal of the gate OFF instruction, and performs a logical operation to calculate the AND of them. The output signal from AND circuit 46 is input to gate drive circuit 30 as a gate signal. When the gate OFF instruction is at the L level, the gate signal input to AND circuit 46 is output from AND circuit 46 to gate drive circuit 30. When the gate OFF instruction is at the H level, an L-level gate signal is input to gate drive circuit 30. In other words, when the gate OFF instruction transitions to the H level, the gate signal forcibly transitions to the L level.

OR circuit 69 receives the output signal from AND circuit 64 and the output signal from on-delay circuit 68, and performs a logical operation to calculate the OR of them. OR circuit 69 outputs an H-level signal when the output signal from on-delay circuit 68 is at the H level or the output signal from AND circuit 64 is at the H level. OR circuit 69 outputs an L-level signal when the output signal from on-delay circuit 68 is at the L level and the output signal from AND circuit 64 is at the L level. The output signal from OR circuit 69 is input to semiconductor switch 15 (FIG. 1) as a semiconductor switch ON instruction.

The semiconductor switch ON instruction is at the H level when the synchronization signal is at the H level and the switching set instruction is at the H level, or when the synchronization signal is at the L level and the switching set instruction is at the H level. When the synchronization signal is at the L level and the switching set instruction is at the H level, the semiconductor switch ON instruction transitions to the H level a predetermined time period after the transition of the switching set instruction to the H level.

In summary, when the synchronization signal is at the H level, a transition of the switching set instruction to the H level causes a transition of the gate OFF instruction to the H level a predetermined time period after a transition of the semiconductor switch ON instruction to the H level. That is, when the output voltage of inverter 10 is synchronized with the voltage of bypass AC power source 22, the gate signal transitions to the L level a predetermined time period after a transition of the semiconductor switch ON instruction to the H level.

When the synchronization signal is at the L level, a transition of the switching set instruction to the L level causes the semiconductor switch ON instruction to be turned on a predetermined time period after a transition of the gate OFF instruction to the H level. That is, when the output voltage of inverter 10 is not synchronized with the voltage of bypass AC power source 22, the semiconductor switch ON instruction is turned on a predetermined time period after a transition of the gate signal to the L level.

AND circuit 70 receives an inverted signal of the output signal from RS flip-flop 63, receives the output switch ON instruction, and performs a logical operation to calculate the AND of them. The output signal from AND circuit 70 is input to output switch 14 (FIG. 1) as an output switch ON instruction.

The output switch ON instruction is at the H level when the switching set instruction is at the L level and the output switch ON instruction is at the H level. When the switching set instruction transitions to the H level, the output switch ON instruction transitions to the L level.

Figure 9:
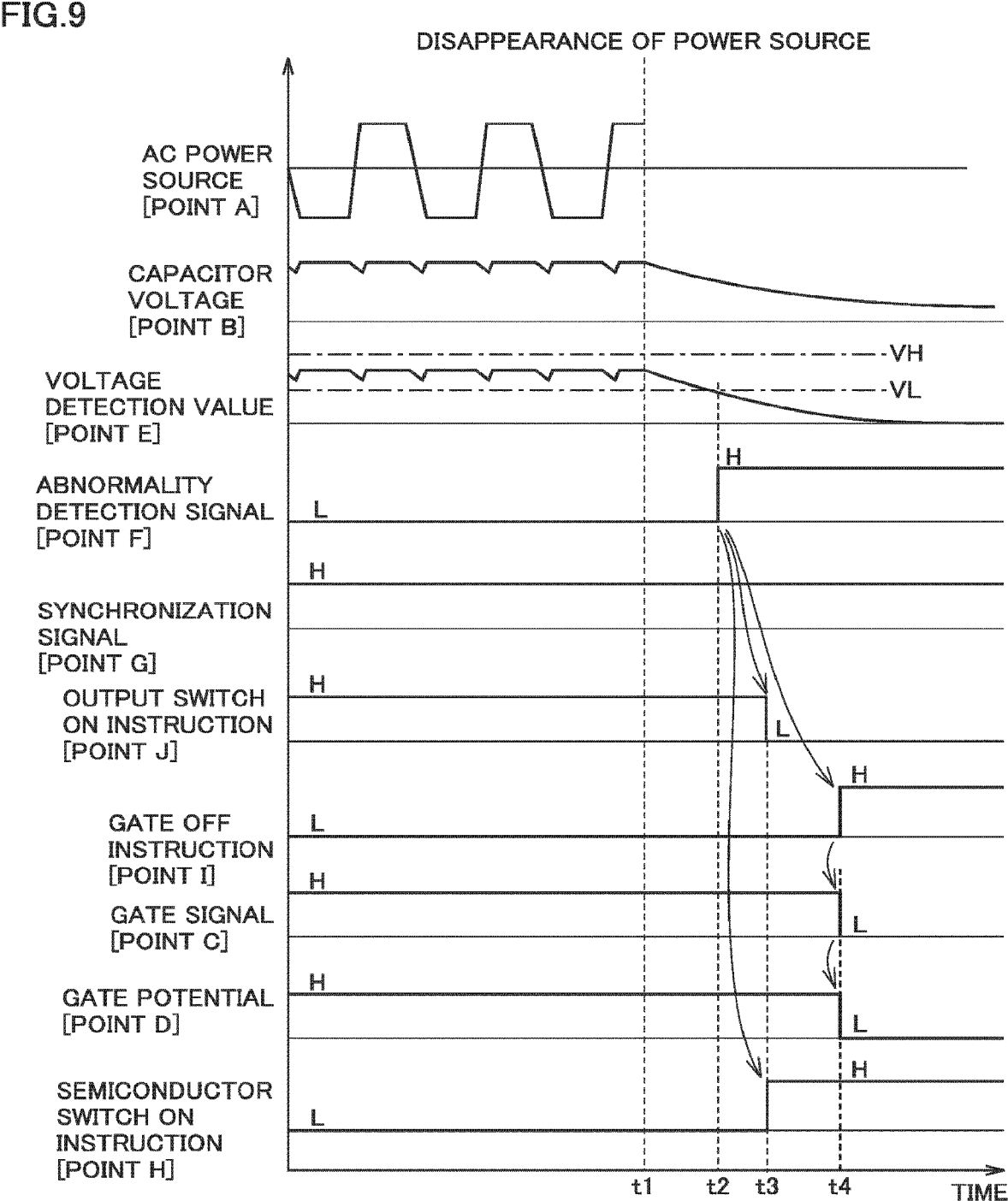
FIG. 9 is a waveform chart schematically showing the temporal changes in potential at points A to J in FIGS. 7 and 8 when an abnormality occurs in an AC power source for a gate drive circuit.

With reference to FIG. 9, the operation of uninterruptible power supply system 1 according to the present embodiment will now be described. In the following description, in gate drive circuit 30 shown in FIG. 7, one end of the primary winding of transformer 32 is denoted by "point A", the connection point between DC positive bus PL1 and one end of smoothing capacitor C1 is denoted by "point B", the control electrode of npn transistor Tr1 in gate driver 30A is denoted by "point C", and the gate electrode of IGBT Qx is denoted by "point D". In abnormality detection circuit 42 shown in FIG. 7, the output terminal of filter 51 is denoted by "point E", and the output terminal of OR circuit 54 is denoted by "point F". In switching instruction generation circuit 44 shown in FIG. 8, the synchronization signal is denoted by "point G", the output terminal of OR circuit 69 is denoted by "point H", the output terminal of OR circuit 67 is denoted by "point I", and the output terminal of AND circuit 70 is denoted by "point J".

FIG. 9 is a waveform chart schematically showing the temporal changes in potential at points A to J in FIGS. 7 and 8 when an abnormality occurs in AC power source 31 of gate drive circuit 30.

With reference to FIG. 9, the potential at point A shows the power source potential supplied from AC power source 31. The potential at point B shows the potential in DC positive bus PL1. The potential at point C shows the potential of the gate signal supplied from controller 18. The potential at point D shows the potential at the gate electrode of IGBT Qx. The potential at point E shows the amplitude of the voltage from AC power source 31 detected by a voltage detector (rectifier circuit 50 and filter 51). The potential at point F shows the potential of the abnormality detection signal. The potential at point G shows the potential of the synchronization signal. The potential at point H shows the potential of the semiconductor switch ON instruction. The potential at point I shows the potential of the gate OFF instruction. The potential at point J shows the potential of the output switch ON instruction. In the example of FIG. 9, the control electrode of npn transistor Tr1 and pnp transistor Tr2 is receiving input of an H-level gate signal from controller 18.

When AC power source 31 is normal, the AC voltage supplied from AC power source 31 undergoes amplitude conversion at transformer 32, then undergoes full-wave rectification at rectifier 33, and is then output to DC positive bus PL1. The potential in DC positive bus PL1 (point B) is smoothed by smoothing capacitor C1 and maintained at a DC voltage having an amplitude proportional to the amplitude of the power source potential (point A). The detection value from the voltage detector (rectifier circuit 50 and filter 51) (point E) has an amplitude proportional to the amplitude of the power source potential (point A).

Npn transistor Tr1, when receiving an H-level gate signal (point C) at its control electrode, is turned on. This causes the potential at the gate electrode of IGBT Qx (point D) to be driven to an H-level potential corresponding to the potential in DC positive bus PL1. IGBT Qx, in response to its gate-source voltage exceeding a threshold voltage, is turned on. The potential of the synchronization signal (point G) is maintained at the H level because the output voltage of inverter 10 is synchronized with the voltage of bypass AC power source 22.

Here, suppose an abnormality, disappearance of the source voltage from AC power source 31, occurs at time t1.

When AC voltage supply from AC power source 31 is stopped, energy accumulated in smoothing capacitor C1 is released, causing a gradual decrease in the potential in DC positive bus PL1 (point B) after time t1. The collector-emitter voltage of npn transistor Tr1 is gradually decreased, accordingly.

After time t1, the detection value from the voltage detector (point E) is also gradually decreased. When the detection value drops to first reference value VL or less (time t2), abnormality detection circuit 42 determines that AC power source 31 is abnormal, and outputs an H-level abnormality detection signal (point F) to switching instruction generation circuit 44 (FIG. 8).

Switching instruction generation circuit 44 (FIG. 8), upon receiving the H-level abnormality detection signal from abnormality detection circuit 42, generates an H-level switching set instruction. The H-level switching set instruction causes the potential of the output switch ON instruction (point J) to transition from the H level to the L level (time t3).

The H-level switching set instruction also causes the potential of the semiconductor switch ON instruction (point H) to transition from the L level to the H level, and causes the potential of the gate OFF instruction (point I) to transition from the L level to the H level. Note that the potential of the semiconductor switch ON instruction (point H) transitions to the H level at time t3, whereas the potential of the gate OFF instruction (point I) transitions to the H level at time t4, where time t4 is later than time t3 by a time lag corresponding to the delay time of on-delay circuit 66.

A transition of the potential of the gate OFF instruction (point I) to the H level (time t4) causes a transition of the potential of the gate signal (point C) from the H level to the L level. Input of an L-level gate signal to the control electrode of npn transistor Tr1 in gate driver 30A turns off npn transistor Tr1. This causes the gate potential of IGBT Qx (point D) to transition to the L level to turn off IGBT Qx.

As shown in FIG. 9, when an abnormality of the power source for gate drive circuit 30 is detected (time t2), the output switch ON instruction transitions to the L level and the semiconductor switch ON instruction transitions to the H level, thereby turning off output switch 14 and turning on semiconductor switch 15. This causes uninterruptible power supply system 1 to shift from the inverter power supply mode to the bypass power supply mode. The gate signal applied to the control electrode of npn transistor Tr1 is maintained at the H level until time t4, which is later than time t3 at which semiconductor switch 15 is turned on.

After the source voltage from AC power source 31 disappears at time t1, if the collector-emitter voltage of npn transistor Tr1 can be maintained as long as the gate signal is maintained at the H level, npn transistor Tr1 can be maintained in an on-state until semiconductor switch 15 is turned on at time t3.

In the present embodiment, power source circuit 30B of gate drive circuit 30 includes high-capacitance smoothing capacitors C1, C2. Smoothing capacitors C1, C2 have capacitance such that smoothing capacitors C1, C2 can store energy for compensating for the collector-emitter voltage of npn transistor Tr1 for a period from the disappearance of the source voltage from AC power source 31 and lasting as long as the gate signal is maintained at the H level (the period from time t1 to time t4 in FIG. 9). Smoothing capacitors C1, C2 are electrolytic capacitors, for example. Smoothing capacitors C1, C2 may be film capacitors if they can store energy for compensating for the collector-emitter voltage of npn transistor Tr1.

Such a configuration allows the gate potential of IGBT Qx (point D) to be maintained at the H level with an H-level gate signal, even after AC power source 31 disappears. The configuration can thus prevent IGBT Qx from malfunctioning during the period from time t1 (i.e., the time at which an abnormality of the power source occurs) to time t3 (i.e., the time at which semiconductor switch 15 is turned on). This allows uninterruptible power supply system 1 to shift to the bypass power supply mode without causing malfunctions of IGBT Qx.

When the output voltage of inverter 10 is not synchronized with the voltage of bypass AC power source 22, the potential of the synchronization signal (point G) is at the L level. In this case, when switching instruction generation circuit 44 receives an H-level abnormality detection signal and generates an H-level switching set instruction, the potential of the gate OFF instruction (point I) transitions to the H level and then the potential of the semiconductor switch ON instruction (point H) transitions to the H level, where the point-H transition is later than the point-I transition by a time lag corresponding to the delay time of on-delay circuit 68.

When the output voltage of inverter 10 is not synchronized with the voltage of bypass AC power source 22, e.g., when these voltages are shifted in phase by 180°, an overvoltage may occur in response to output switch 14 being turned off and semiconductor switch 15 being turned on, which may damage load 24. To address this, semiconductor switch 15 is turned on after a delay time that is preset for on-delay circuit 68, as shown in FIG. 9. This can prevent or reduce an overvoltage on load 24, although involving some instantaneous interruption. Even in this case, the gate potential of IGBT Qx can be maintained at the H level during the period from when an abnormality of the power source occurs to when output switch 14 is turned off, thus preventing malfunctions of IGBT Qx until semiconductor switch 15 is turned on.

As described above, the uninterruptible power supply system according to the present embodiment can maintain the gate potential of the switching element during the period from when an abnormality of the power source for gate drive circuit 30 is detected to when semiconductor switch 15 is turned on in the inverter power supply mode. This allows the uninterruptible power supply system to shift to the bypass power supply mode without causing malfunctions of the switching element.

[Variation]

Figure 10:
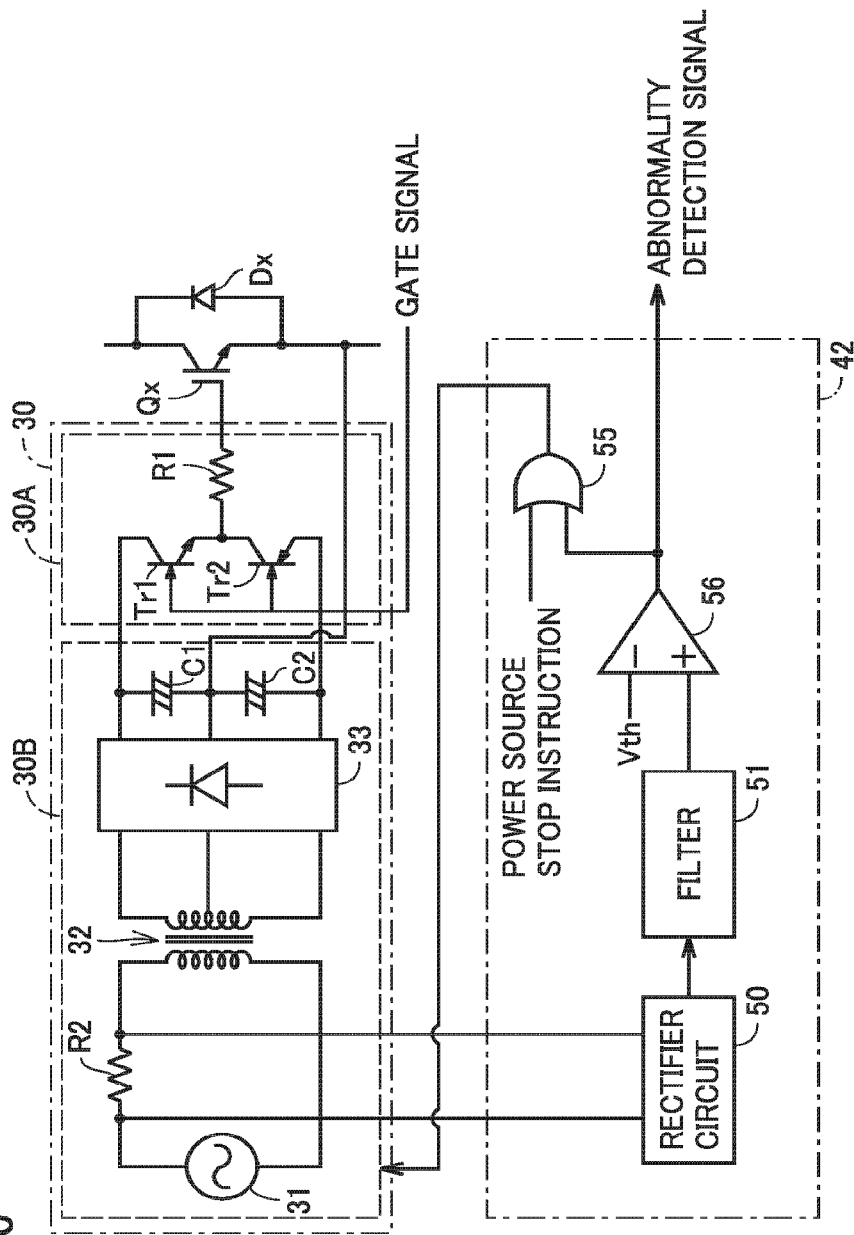
FIG. 10 is a block diagram showing a first variation of the abnormality detection circuit shown in FIG. 6.
Figure 11:
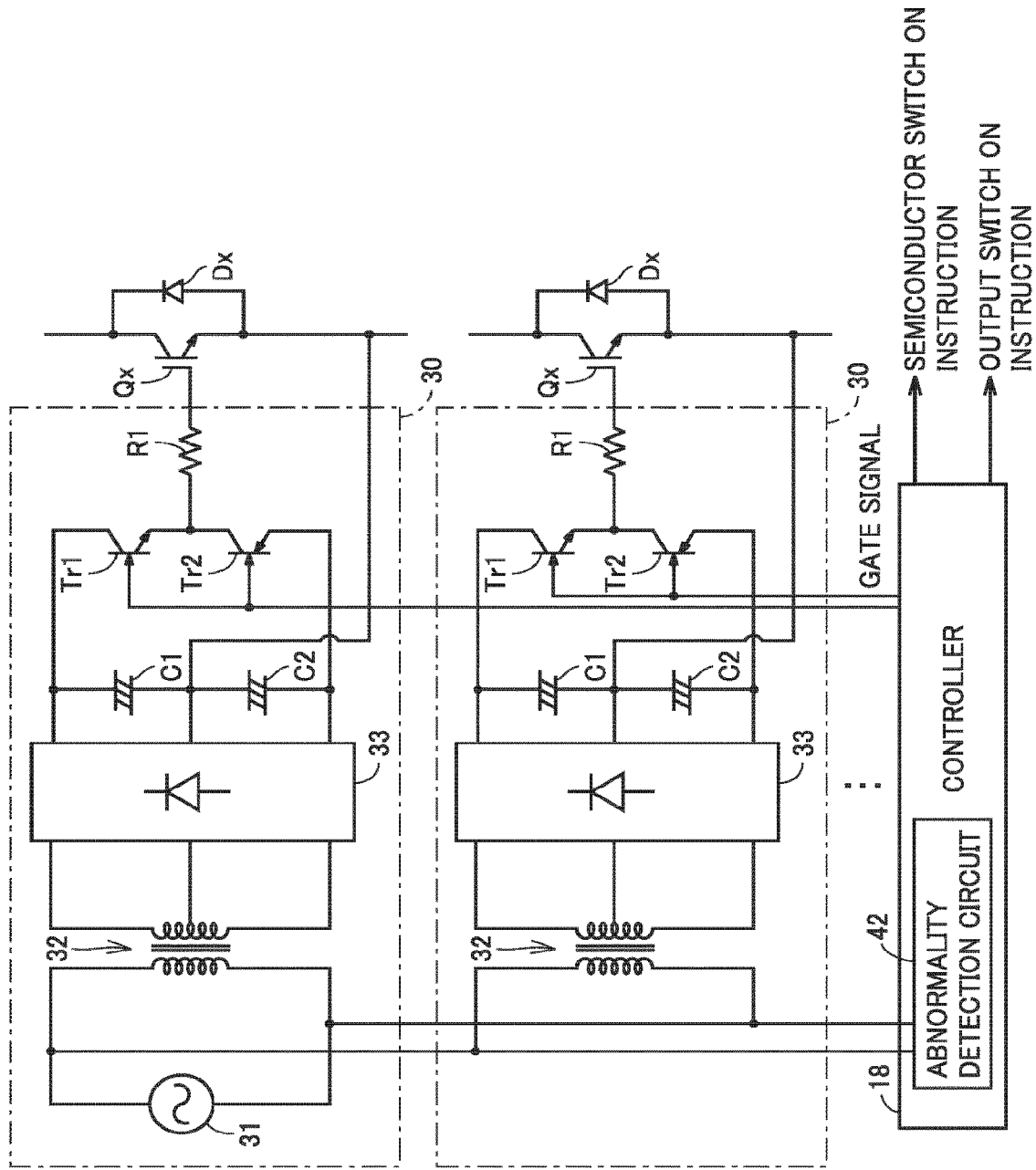
FIG. 11 is a block diagram showing a second variation of the abnormality detection circuit shown in FIG. 6.

With reference to FIGS. 10 and 11, a variation of uninterruptible power supply system 1 according to the present embodiment will now be described.

FIG. 10 is a block diagram showing a first variation of abnormality detection circuit 42 shown in FIG. 6.

With reference to FIG. 10, abnormality detection circuit 42 according to the first variation is different from abnormality detection circuit 42 in FIG. 7 in that comparators 52, 53 and OR circuit 54 are replaced with a shunt resistor R2 and a comparator 56.

Shunt resistor R2 is electrically connected between AC power source 31 and the primary winding of transformer 32 in power source circuit 30B. Shunt resistor R2 produces a voltage corresponding to the current flowing between AC power source 31 and the primary winding of transformer 32. A high current through shunt resistor R2 causes a high voltage between the terminals of shunt resistor R2. The voltage produced between the terminals of shunt resistor R2 is input to rectifier circuit 50.

Rectifier circuit 50 performs full-wave rectification of the voltage across shunt resistor R2, and outputs the rectified voltage to filter 51. Filter 51 filters out a high-frequency component from the voltage rectified by rectifier circuit 50. The output voltage of filter 51 is maintained at a DC voltage corresponding to the amplitude of the voltage across shunt resistor R2. Shunt resistor R2, rectifier circuit 50, and filter 51 form the "current detector" for detecting the current supplied from AC power source 31.

Comparator 56 compares the output voltage of filter 51 with a reference value Vth, and outputs a signal indicating the comparison result. Reference value Vth is set to the amplitude of the voltage that is produced across shunt resistor R2 when the supply current from AC power source 31 is an overcurrent. When the output voltage of filter 51 is higher than reference value Vth, the output signal from comparator 56 is at the H level. When the output voltage of filter 51 is not higher than reference value Vth, the output signal from comparator 56 is at the L level. The output signal from comparator 56 is provided to switching instruction generation circuit 44 (FIG. 8) as an abnormality detection signal.

In this way, when the supply current from AC power source 31 is an overcurrent, abnormality detection circuit 42 determines that AC power source 31 of gate drive circuit 30 is abnormal, and outputs an H-level abnormality detection signal to switching instruction generation circuit 44. The H-level abnormality detection signal causes switching instruction generation circuit 44 to generate an H-level gate OFF instruction, an H-level semiconductor switch ON instruction, and an L-level output switch ON instruction, as described with reference to FIG. 8.

When the supply current from AC power source 31 is normal, abnormality detection circuit 42 determines that AC power source 31 of gate drive circuit 30 is normal, and thus outputs an L-level abnormality detection signal to switching instruction generation circuit 44.

OR circuit 55 receives the abnormality detection signal output from comparator 56 and the power source stop instruction output from control instruction generation circuit 40 (FIG. 6), and performs a logical operation to calculate the OR of them. The logical operation result from OR circuit 55 is output to gate drive circuit 30 as a power source stop instruction. Gate drive circuit 30 receives an H-level power source stop instruction when an H-level power source stop instruction is generated by control instruction generation circuit 40 or an H-level abnormality detection signal is generated by abnormality detection circuit 42 (corresponding to when an abnormality of AC power source 31 is detected). Gate drive circuit 30, upon receiving the H-level power source stop instruction, stops power supply from power source circuit 30B to gate driver 30A.

FIG. 11 is a block diagram showing a second variation of abnormality detection circuit 42 shown in FIG. 6.

With reference to FIG. 11, abnormality detection circuit 42 according to the second variation is shared by a plurality of gate drive circuits 30. Abnormality detection circuit 42 according to the second variation has the same configuration as abnormality detection circuit 42 in FIG. 6.

In this variation, AC power source 31 is shared by a plurality of gate drive circuits 30. Abnormality detection circuit 42, which detects an abnormality of AC power source 31, can also be shared by a plurality of gate drive circuits 30. Such a configuration requires only one AC power source 31 and only one abnormality detection circuit 42 for a plurality of IGBTs included in uninterruptible power supply system 1, contributing to reduction in size and cost of uninterruptible power supply system 1.

The embodiments disclosed herein should be considered illustrative in all respects, not limitative. The present invention is defined not by the above description but by the terms of the claims, and is intended to include any modification in the meaning and scope equivalent to the terms of the claims.

REFERENCE SIGNS LIST

1: uninterruptible power supply system; 2, 8, 14: electromagnetic contactor; 3, 11: current detector; 4, 9, 13: capacitor; 5, 12: reactor; 6: converter; 7: bidirectional chopper; 10: inverter; 15: semiconductor switch; 17: operation unit; 18: controller; 19: control power source; 21: commercial AC power source; 22: bypass AC power source; 23: power storage device; 24: load; 30, 100: gate drive circuit; 30A, 100A: gate driver; 30B, 100B: power source circuit; 31: AC power source; 32: transformer; 33: rectifier; 40: control instruction generation circuit; 42: abnormality detection circuit; 44: switching instruction generation circuit; 46, 64, 65, 70: AND circuit; 50: rectifier circuit; 521: filter; 52, 53, 56: comparator; 54, 55, 60, 67, 69: OR circuit; 62: D flip-flop; 63: RS flip-flop; 66, 68: on-delay circuit; Tr1: npn transistor; Tn2: pnp transistor; R1: gate resistor; R2: shunt resistor; Q1 to Q6, Q11 to Q16, Qx: IGBT (switching element); D1 to D6, D11 to D16, Dx: diode; C1, C2, C10, C20: smoothing capacitor; PL1: DC positive bus; CL1: DC neutral point bus; NL1: DC negative bus; L1, L2: DC line

The invention claimed is:

1. An uninterruptible power supply system comprising:
   a first terminal connected to a commercial AC power source;
   a second terminal connected to a bypass AC power source;
   a third terminal connected to a load;
   a converter including a plurality of switching elements, wherein the converter converts AC power supplied from the commercial AC power source through the first terminal into DC power;
   an inverter including a plurality of switching elements, wherein the inverter converts DC power generated by the converter or DC power from a power storage device into AC power;
   a first switch having one terminal that receives an output voltage of the inverter, and the other terminal connected to the third terminal;
   a second switch connected between the second terminal and the third terminal;
   a controller that controls on and off of the plurality of switching elements included in the converter and the inverter; and
   a plurality of gate drive circuits each of which drives a gate of a corresponding switching element of the plurality of switching elements, wherein
   each of the plurality of gate drive circuits includes
      a gate driver that drives a gate potential of the switching element to a potential corresponding to an H level or an L level, in accordance with a gate signal input from the controller to a gate electrode of the switching element, and
      a power source circuit that supplies power to the gate driver,
   the controller includes an abnormality detection circuit that detects an abnormality of the power source circuit of each of the plurality of gate drive circuits, wherein,
   when the first switch is ON and the second switch is OFF, the controller, upon detection of the abnormality of the power source circuit by the abnormality detection circuit, turns on the second switch and turns off the first switch, and
   the gate drive circuit maintains the gate potential of the switching element during a period from when the abnormality of the power source circuit is detected to when the second switch is turned on.

2. The uninterruptible power supply system according to claim 1, wherein
   upon detection of the abnormality of the power source circuit, the controller outputs the gate signal for turning off the switching element to each of the plurality of gate drive circuits after generating a control instruction for turning on the second switch.

3. The uninterruptible power supply system according to claim 2, wherein
   when the output voltage of the inverter is synchronized with the bypass AC power source, the controller, upon detection of the abnormality of the power source circuit, generates a control instruction for turning off the switching element after generating the control instruction for turning on the second switch.

4. The uninterruptible power supply system according to claim 3, wherein
   when the output voltage of the inverter is not synchronized with the bypass AC power source, the controller, upon detection of the abnormality of the power source circuit, generates the control instruction for turning on the second switch after generating the control instruction for turning off the switching element.

5. The uninterruptible power supply system according to claim 1, wherein
   the power source circuit includes
      an AC power source,
      a rectifier that rectifies AC power supplied from the AC power source, and
      a smoothing capacitor that smoothes a voltage rectified by the rectifier and supplies the smoothed voltage to the gate driver, and
   the smoothing capacitor has a capacitance such that the smoothing capacitor stores energy for compensating for a source voltage of the gate driver during a period from when the abnormality of the power source circuit occurs to when the gate signal for turning off the switching element is output.

6. The uninterruptible power supply system according to claim 5, wherein
   the smoothing capacitor is an electrolytic capacitor.

7. The uninterruptible power supply system according to claim 5, wherein
   the AC power source is shared by the plurality of gate drive circuits, and
   the abnormality detection circuit detects the abnormality of the power source circuit based on a detection value of a supply voltage from the AC power source or based on a detection value of a supply current from the AC power source.

* * * * *